(12) United States Patent
Jentz et al.

(10) Patent No.: US 11,306,631 B2
(45) Date of Patent: Apr. 19, 2022

(54) SYSTEMS AND METHODS FOR CRANKCASE SYSTEM DIAGNOSTICS

(71) Applicant: Ford Global Technologies, LLC, Dearborn, MI (US)

(72) Inventors: Robert Roy Jentz, Westland, MI (US); Matthew Carpenter, Northville, MI (US); Michael Stephen Sweppy, Manchester, MI (US); Adam Joseph Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 16/816,039

(22) Filed: Mar. 11, 2020

(65) Prior Publication Data

US 2021/0285348 A1  Sep. 16, 2021

(51) Int. Cl.

| F01M 13/00 | (2006.01) |
|---|---|
| F02M 35/10 | (2006.01) |
| F02M 25/06 | (2016.01) |
| F01M 11/03 | (2006.01) |
| F01M 13/04 | (2006.01) |
| B60K 6/28 | (2007.10) |
| B60K 6/26 | (2007.10) |
| B60K 6/24 | (2007.10) |
| B01D 45/08 | (2006.01) |
| B60Q 9/00 | (2006.01) |

(52) U.S. Cl.
CPC ......... *F01M 13/0011* (2013.01); *B01D 45/08* (2013.01); *B60K 6/24* (2013.01); *B60K 6/26* (2013.01); *B60K 6/28* (2013.01); *B60Q 9/00* (2013.01); *F01M 11/03* (2013.01); *F01M 13/04* (2013.01); *F02M 25/06* (2013.01); *F02M 35/1038* (2013.01); *F02M 35/10222* (2013.01); *F01M 2013/0083* (2013.01); *F01M 2250/64* (2013.01)

(58) Field of Classification Search
CPC .... F01M 13/0011; F01M 11/03; F01M 13/04; F01M 2013/0083; F01M 2250/64; B01D 45/08; B60K 6/24; B60K 6/26; B60K 6/28; F02M 25/06; F02M 35/10222; F02M 35/1038; B60Q 9/00
USPC ....................................................... 123/573
See application file for complete search history.

(56) References Cited

U.S. PATENT DOCUMENTS

| 9,416,694 B2 | 8/2016 | Jentz et al. | |
| 2011/0232477 A1* | 9/2011 | Taki .................. | F01M 13/0011 92/82 |

(Continued)

*Primary Examiner* — Yi-Kai Wang
(74) *Attorney, Agent, or Firm* — Geoffrey Brumbaugh McCoy Russell LLP (57) ABSTRACT

Methods and systems are provided for assessing a state of a vent hose that fluidically couples a crankcase of an engine to an engine air intake system. In one example, a method may include sealing the crankcase from the vent hose, initiating cranking of the engine, monitoring a series of pressure pulsations during a monitoring window duration via a pressure sensor positioned between a crankcase oil separator and the vent hose, and indicating a presence of degradation associated with the vent hose based on the series of pressure pulsations and the monitoring window duration. In this way, diagnosis of a state of the vent hose may be reliably assessed without crankcase pressures confounding pressure measurements as recorded via the pressure sensor.

19 Claims, 6 Drawing Sheets

(56) References Cited

U.S. PATENT DOCUMENTS

| | | |
|---|---|---|
| 2013/0028225 A1 | 1/2013 | Ko et al. |
| 2014/0081549 A1 | 3/2014 | Rollinger et al. |
| 2014/0081550 A1 | 3/2014 | Jentz et al. |
| 2014/0081564 A1* | 3/2014 | Pursifull .............. G01M 15/08 |
| | | 701/113 |
| 2016/0115911 A1* | 4/2016 | Newman ............... F01M 13/02 |
| | | 123/568.11 |
| 2020/0256276 A1* | 8/2020 | Sekiguchi ............. F02M 35/08 |

* cited by examiner

SYSTEMS AND METHODS FOR CRANKCASE SYSTEM DIAGNOSTICS

FIELD

The present description relates generally to methods and systems for inferring whether a vent hose that fluidically couples a crankcase to an air intake system of an engine is degraded or is functioning as expected or desired.

BACKGROUND/SUMMARY

During a power stroke of a piston of an engine cylinder, a portion of the gases combusted within the cylinder may escape past a ring forming a seal around the piston base in a process known as blow-by. The escaped gases may accumulate in the crankcase, resulting in a buildup of pressure that may lead to degradation of oil stored in the crankcase to lubricate piston movement. The engine may include a crankcase ventilation system to vent gases out of the crankcase and into an engine intake manifold to provide continual evacuation of gases from inside the crankcase in order to reduce degradation of various engine components in the crankcase. The crankcase ventilation system may include a positive crankcase ventilation valve (PCV valve) for enabling one-way or two-way flow of crankcase gases from inside the crankcase to the intake manifold.

PCV flow characteristics with a dual-flow PCV valve may include vapors flowing from an air intake system through the crankcase and into the intake manifold under conditions where the intake manifold is at a vacuum or negative pressure with respect to atmospheric pressure. Alternatively, under boosted engine operation (e.g., positive intake manifold pressure with respect to atmospheric pressure), vapors may flow in a direction from the intake manifold through the crankcase and a PCV vent hose, to the air intake system. For such engines the PCV vent hose may have to be periodically assessed as to whether there is a presence or absence of degradation associated with the vent hose.

U.S. Pat. No. 9,416,694 discloses methods for using a crankcase vent hose pressure or flow sensor positioned within the vent hose for diagnosing a location and nature of a crankcase system integrity breach. Specifically, U.S. Pat. No. 9,416,694 discloses determining both crankcase vent tube pressure changes at engine crank and in response to an increasing engine airflow rate, and based on the pressure change profiles, indicating one of an absence of degradation, degradation associated with a side of the vent hose coupled to the crankcase, or degradation associated with another side of the vent hose coupled to the air intake system.

However, the inventors have herein recognized potential issues with the above-mentioned approach. Specifically, it is herein recognized that reverse crankcase flow (e.g., under boosted operation) for engine systems that include bi-directional crankcase flow may result in increased crankcase pressures, which may confound the diagnostic that relies on the pressure sensor positioned essentially in a middle of the vent hose. Said another way, the pressure sensor may report on different pressures coming from either end of the vent hose, thereby degrading the ability to robustly infer a particular source of degradation associated with the vent hose.

Accordingly, the inventors have herein developed systems and methods to at least partially address the above-mentioned issues. In one example, a method comprises sealing a crankcase of an engine from a vent hose that is part of a positive crankcase ventilation system, initiating cranking of the engine and monitoring a series of pressure pulsations during a monitoring window duration via a pressure sensor positioned between a crankcase oil separator and the vent hose. The method further includes a presence or an absence of degradation based on the series of pressure pulsations and the monitoring window duration. In this way, a state of the vent hose may be reliably assessed without the pressure monitoring being influenced by crankcase pressures. By reliably assessing the state of the vent hose, mitigating action may be taken in response to the presence of indicated degradation, and the mitigating action may reduce release of undesired emissions to atmosphere, improve lifetime of the engine, and improve customer satisfaction.

As one example of the method, the crankcase oil separator may include one or more sealing flaps that close responsive to a pressure differential between the crankcase and the vent hose being within a predetermined threshold of a zero pressure differential across the one or more sealing flaps. In such an example, sealing the crankcase of the engine from the vent hose comprises the one or more sealing flaps closing based on the pressure differential between the crankcase and the vent hose being within the predetermined threshold of the zero pressure differential.

As another example of the method, the method may include beginning the monitoring window when the engine cranking is initiated. The method may further include ending or stopping the monitoring window when the crankcase of the engine is no longer fully sealed from the vent hose. In another example, the method may further include ending or stopping the monitoring window when the engine reaches a predetermined engine speed.

As yet another example of the method, the method may further comprise indicating a restriction in an intake air filter of the engine responsive to the series of pressure pulsations exceeding a pressure pulsation threshold during the monitoring window duration. In such an example, the method may further comprise indicating an amount of the restriction in the air intake filter as an extent by which the series of pressure pulsations exceed the pressure pulsation threshold during the monitoring window duration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
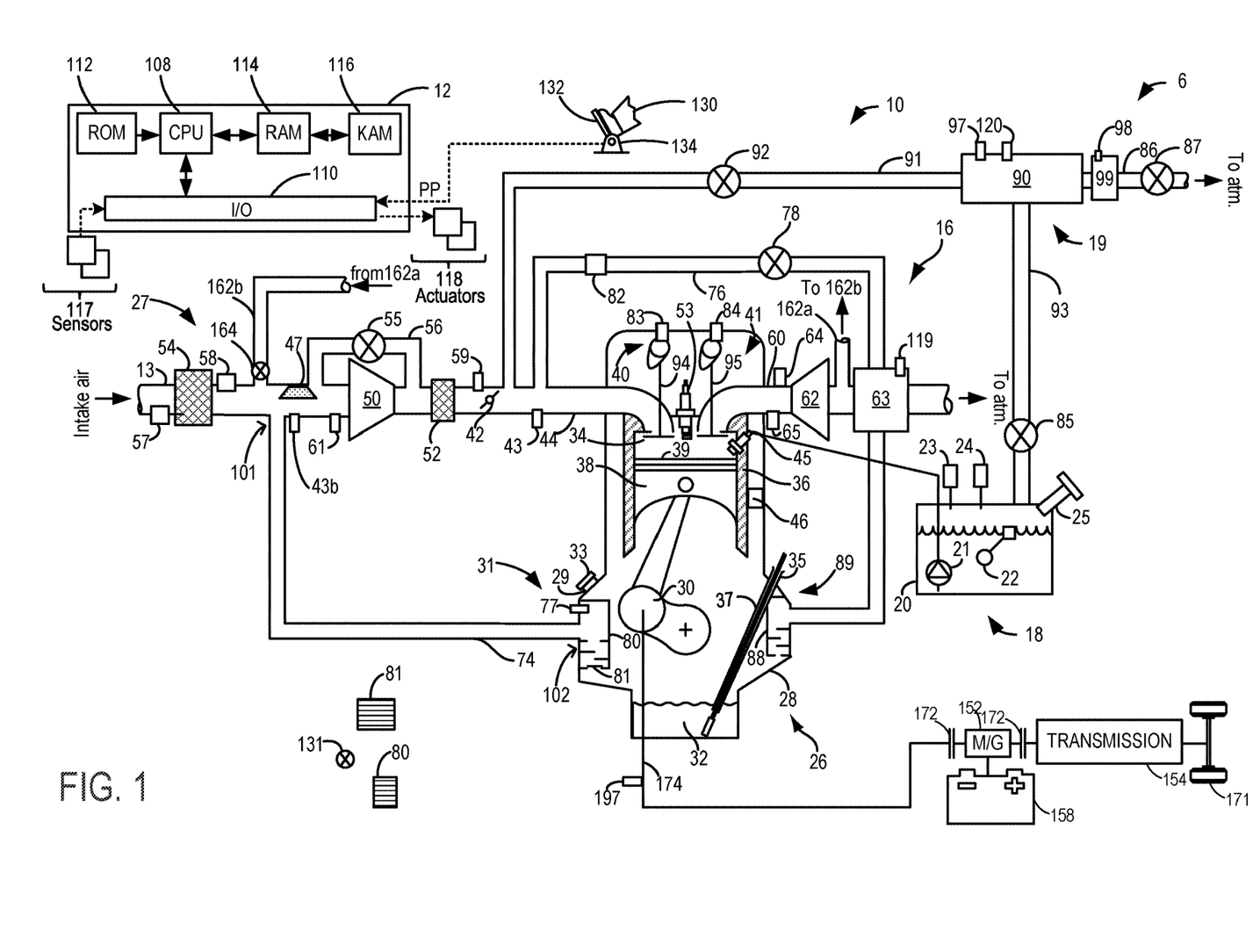
FIG. 1 shows a schematic description of an engine including an engine positive crankcase ventilation system (PCV)
Figure 2A:
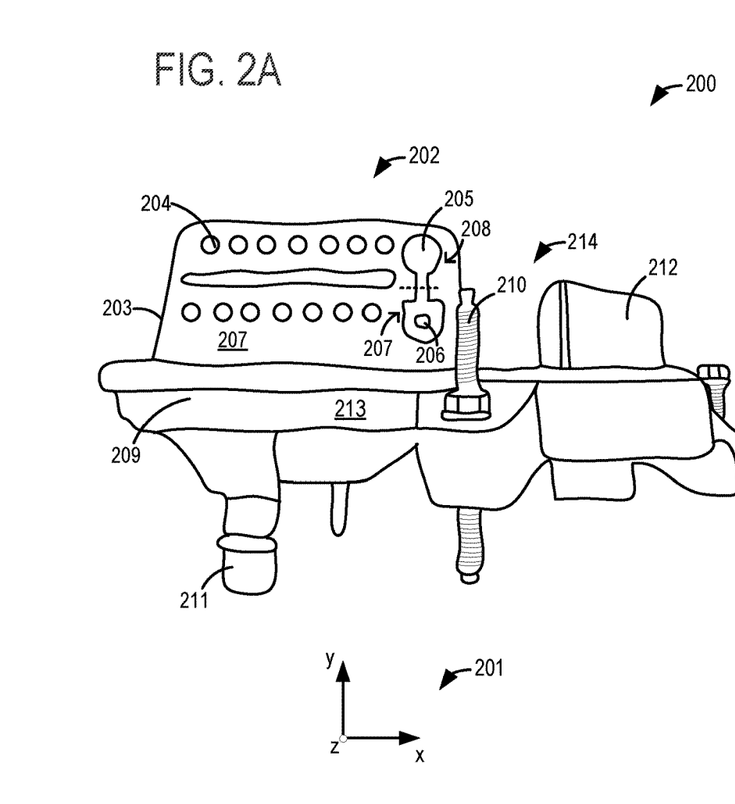
FIG. 2A depicts an example illustration of an oil separator of the present disclosure from a first view.
Figure 2B:
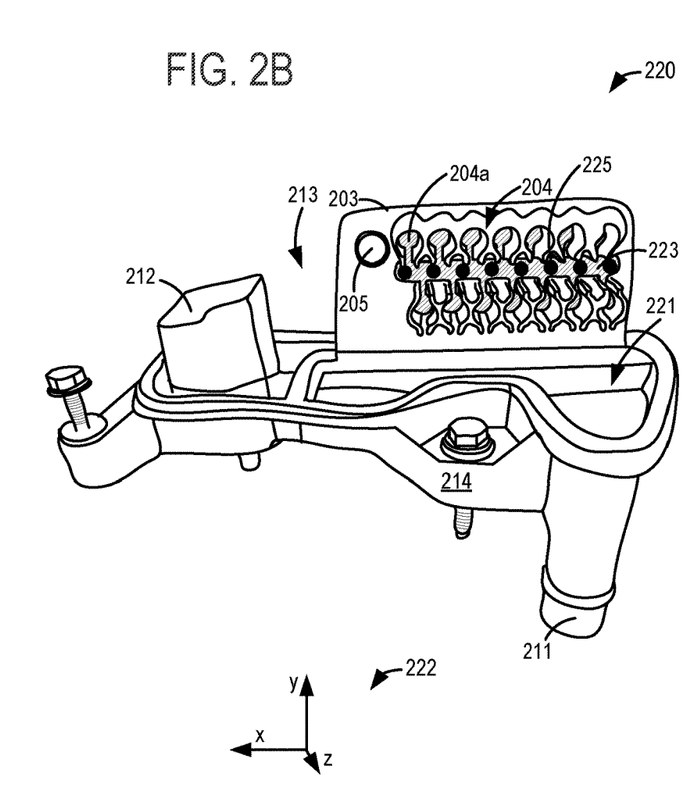
FIG. 2B depicts another example illustration of the oil separator of FIG. 2A from a second view.
Figure 2C:
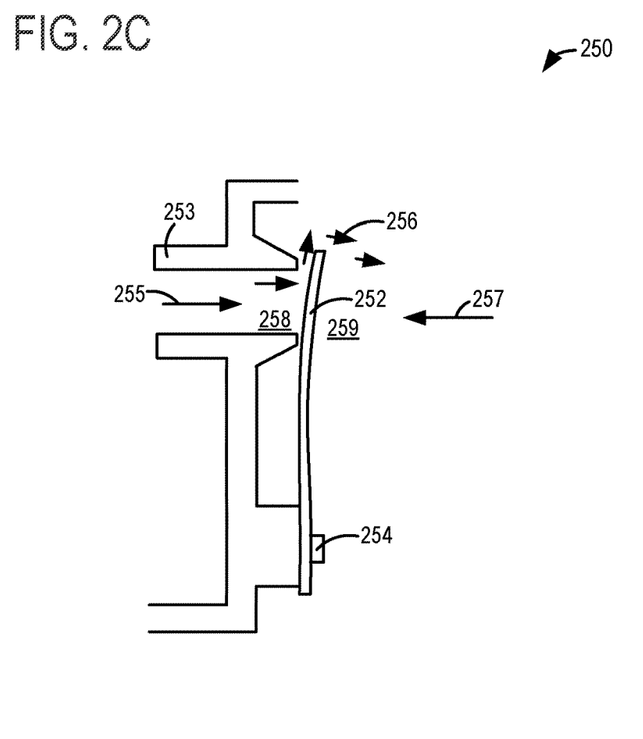
FIG. 2C depicts an example illustration of how a sealing flap included in the oil separator of FIGS. 2A-2B opens and closed as a function of a pressure differential across the sealing flap.
Figure 2D:
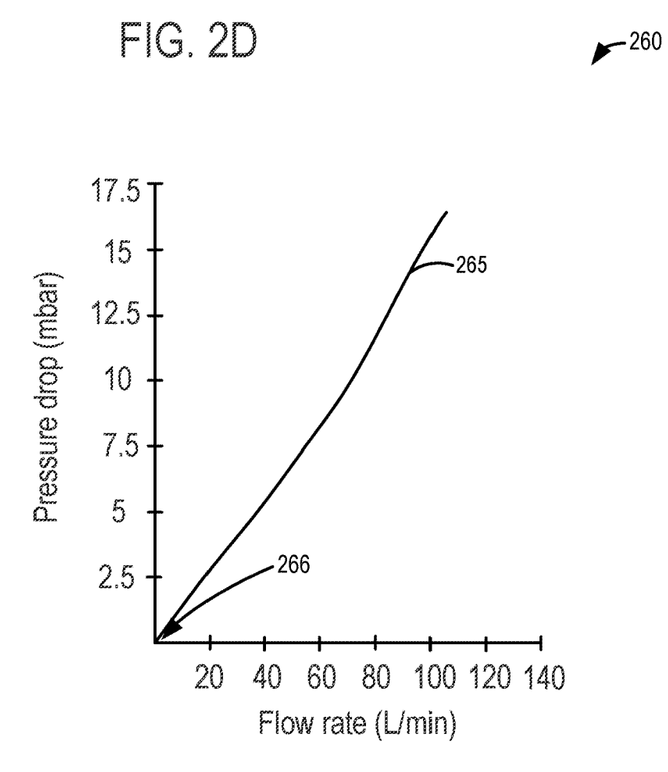
FIG. 2D depicts a graphical illustration of how a flow rate through the oil separator of FIGS. 2A-2B varies as a function of a pressure differential.
Figure 3:
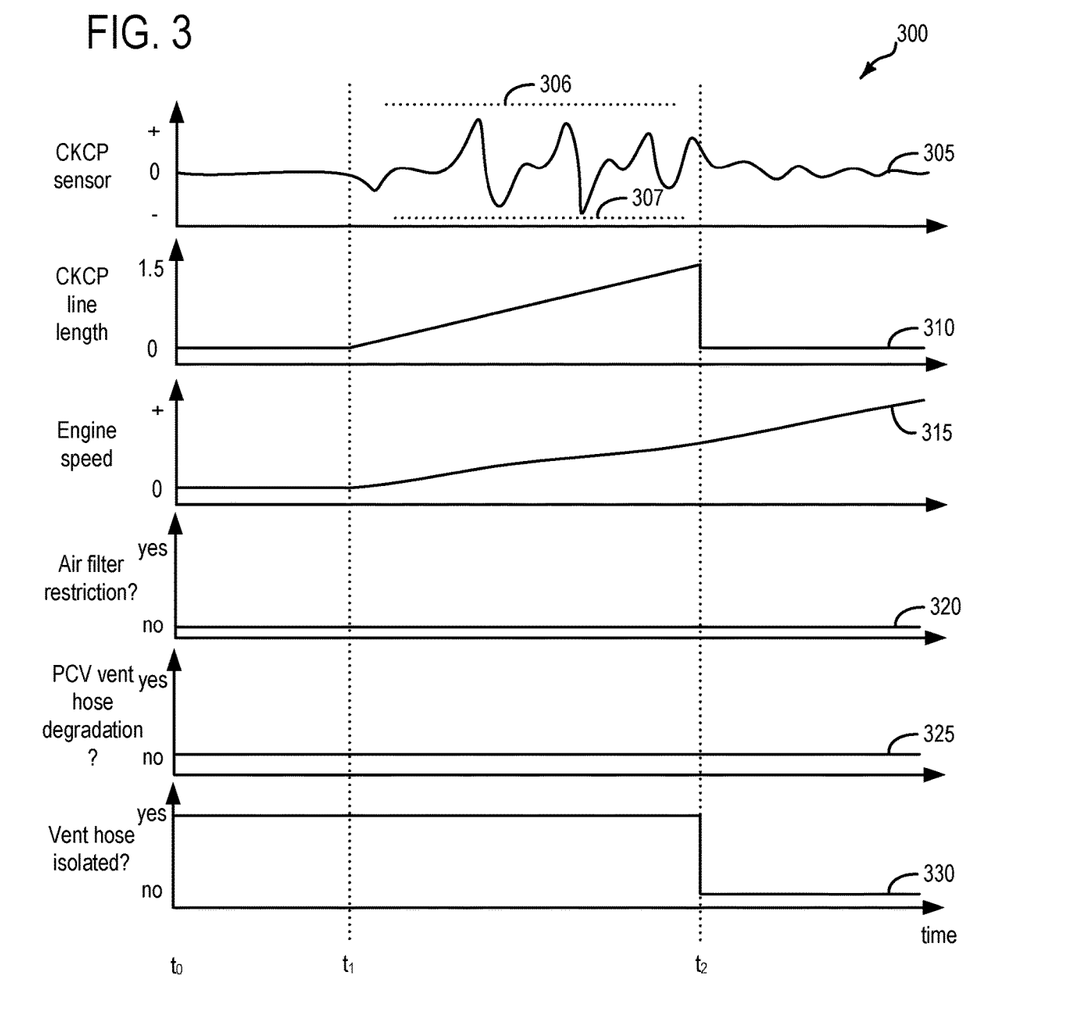
FIG. 3 depicts a prophetic example timeline illustrating a PCV vent hose diagnostic that indicates an absence of degradation associated with the PCV vent hose.
Figure 4:
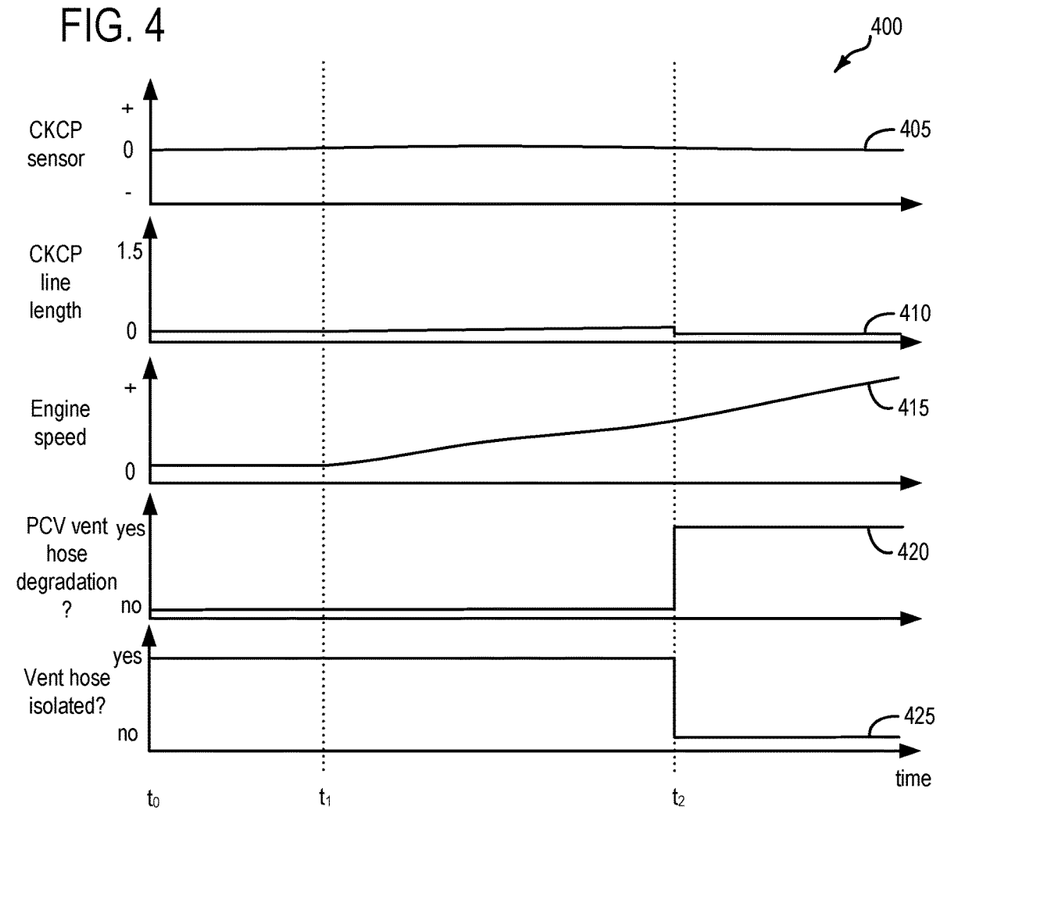
FIG. 4 depicts a prophetic example timeline illustrating a PCV vent hose diagnostic that indicates a presence of degradation associated with the PCV vent hose.

The following description relates to systems and methods for inferring whether there is degradation associated with a PCV vent hose that fluidically couples a crankcase of an engine to an air intake system. Accordingly, FIG. 1 depicts an example engine that includes a PCV system with a vent hose that fluidically couples a crankcase of the engine to the air intake system. In order to effectively diagnose the presence or absence of degradation associated with the vent hose, the vent hose may be positioned between the air intake system and a crankcase pressure (CKCP) sensor, rather than, for example, including the CKCP sensor at a position within the vent hose. An oil separator may be included in the crankcase of the engine and may include one or more sealing flaps that may respond to pressure differentials (e.g., between the vent hose and the crankcase), such that when there is an absence of the pressure differential the oil separator effectively seals the vent hose from the crankcase. Accordingly, FIGS. 2A-2B depict different views of an exemplary oil separator that may be used with the methodology for diagnosing the PCV vent hose according to the present disclosure. FIG. 2C illustratively depicts how pressure differentials may cause a sealing flap associated with the oil separators of the present disclosure to open, which may thereby fluidically couple the vent hose to the crankcase. FIG. 2D graphically illustrates how flow rate through such an oil separator may increase as a function of an increasing pressure differential across the oil separator (and associated sealing flaps). FIGS. 3-4 depict prophetic example timelines for using a methodology depicted at FIG. 5 for determining whether there is an absence (see FIG. 3) or a presence (see FIG. 4) of a source of degradation associated with the PCV vent hose.

Turning now to FIG. 1, a schematic depiction of a hybrid vehicle system 6 is presented that can derive propulsion power from engine 10 and/or an on-board energy storage device, such as a battery system. An energy conversion device, such as a generator, may be operated to absorb energy from vehicle motion and/or engine operation, and then convert the absorbed energy to an energy form suitable for storage by the energy storage device. Engine 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Three piston rings 39 may be coupled to the outer wall of the piston 38 to seal the combustion chamber. By sealing the combustion chamber, escape of combustion gases from the combustion chamber to the crankcase may be reduced. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

A throttle 42 may be disposed in the engine intake to control the airflow entering intake manifold 44 and may be preceded upstream by compressor 50 followed by charge air cooler 52, for example. An intake system air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. Intake air may bypass compressor 50 via compressor bypass conduit 56, during conditions wherein compressor bypass valve (CBV) 55 is opened. In this way, pressure buildup at the compressor inlet may be relieved.

Each cylinder of engine 10 may include one or more intake valves and one or more exhaust valves. For example, cylinder 34 is shown including at least one intake valve 94 and at least one exhaust valve 95 located at an upper region of cylinder 34. The valves of cylinder 34 may in some examples be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. As one non-limiting example, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 94 may be controlled by first VDE actuator 83 while deactivation of exhaust valve 95 may be controlled by second VDE actuator 84. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. Cylinder 34 may have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, an intake air oxygen sensor 43 may be positioned downstream of throttle 42. Furthermore, in some examples, an air intake system hydrocarbon (AIS HC) trap 47 may be positioned downstream of air filter 54, but upstream of compressor 50. AIS HC trap 47 may capture and store residual fuel vapors, such that the fuel vapors are not routed to atmosphere.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74, also referred to herein as vent hose 74. A first side 101 of crankcase ventilation tube 74 may be mechanically coupled, or connected, to fresh air intake passage 13 of air intake system 27 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28.

A first oil separator 80 may be included in crankcase 28, in close proximity to vent hose 74. Specifically, a side of the crankcase that is coupled to vent hose 74 may be referred to as a push side 31. As depicted, first oil separator 80 may comprise a baffled oil separator, although other types of oil separators are within the scope of this disclosure. First oil separator 80 may include one or more sealing flaps that prevent flow when in a closed configuration, but enable flow in an open position. For illustrative purposes, a single sealing flap 81 is shown at FIG. 1 associated with first oil separator 80, but it may be understood that first oil separator may include more than one sealing flap, as will be discussed in greater detail below in particular with regards to FIGS. 2A-2B. The one or more sealing flaps associated with first oil separator 80 may open/close in response to pressure differences between vent hose (e.g., vent hose 74) pressure and crankcase pressure, for example. In other words, the one or more sealing flaps may comprise passively actuatable sealing flaps that are actuated via pressure differences across the one or more sealing flaps.

As mentioned above, in some examples a crankcase pressure sensor (CKCP sensor) may be included in vent hose 74. However, it is herein recognized that inclusion of the CKCP sensor in the vent hose 74 may complicate diagnostics that aim to infer whether the vent hose is properly connected to each of the air intake system and the crankcase, or whether the vent hose is exhibiting some form of degradation (e.g., disconnected, compromised in terms of integrity, etc.). Accordingly, in order to improve an ability to diagnose whether there is a presence or an absence of degradation associated with vent hose 74, in an embodiment of the present disclosure CKCP sensor 77 is included in a push side (e.g., push side 31) cam cover (not specifically shown). Specifically, CKCP sensor 77 is positioned on a fresh air side of the first oil separator 80, such that the CKCP sensor may be protected from liquid oil and other combustion byproducts. Said another way, vent hose 74 may be positioned between CKCP sensor 77 and air intake system 27. In this way, the push side oil separator (e.g., first side oil separator 80) may act as an isolation valve at particular pressure differences between crankcase 28 and vent hose 74. For example, flow may be prevented during particular operating conditions, such as during an engine crank event, engine idle conditions and engine pull-up events for start/stop hybrid electric vehicles, when a pressure difference between crankcase 28 and air intake system 27 is within a predetermined threshold difference (e.g., within a predetermined threshold of a zero pressure difference). When flow is prevented during such operating conditions, the CKCP sensor may be exposed to just air intake system pressures, which may enable a vent hose diagnostic to be conducted in the absence of confounding crankcase pressures (since the CKCP sensor is isolated from the crankcase pressures by the oil separator being sealed), which may improve an ability to properly diagnose functional operation of the vent hose. Such a diagnostic is discussed in detail with regard to the method of FIG. 5 below.

One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with CKCP sensor 77. In some embodiments, pressure sensor 61 may be coupled in intake passage 13 downstream of air filter 54 and upstream of compressor 50 to provide an estimate of the compressor inlet pressure (CIP). Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. Additionally or alternatively, PCV valve 78 may comprise a two-way valve that enables two-way flow through the PCV valve. For example, crankcase venting while the engine is boosted may be realized via a metering flow orifice (not shown) built into the PCV valve. It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation).

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, as discussed above, crankcase 28 may include first oil separator 80 on push-side 31 of crankcase 28. First oil separator 80 may remove oil from the stream of gases exiting crankcase 28 during boosted engine operation. A second oil separator 88 may be disposed on a pull-side 89 of crankcase 28, and which may serve to filter oil from vapors exiting crankcase 28 before they re-enter intake manifold 44. Similar to first oil separator 80, second oil separator may comprise a baffled oil separator, although other oil separator designs are within the scope of this disclosure. While not explicitly illustrated, in some examples second oil separator 88 may include one or more sealing flaps, that passively open in response to predetermined pressure differences between crankcase 28 and PCV line 76. In other examples, second oil separator 88 may not include passively actuatable sealing flap(s), without departing from the scope of this disclosure. Additionally, PCV line 76 may also include a vacuum sensor 82 coupled to the PCV system. In other embodiments, a MAP or manifold vacuum (ManVac) sensor may be located in intake manifold 44.

Engine system 8 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor canister 90, via conduit 93, before being purged to engine intake manifold 44.

Fuel vapor canister 90 may be disposed in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve 92. A loading state of vapor canister 90 may be indicated by a hydrocarbon sensor 120. While a single canister 90 is shown, it will be appreciated that fuel system 18 may include any number of canisters. In one example, canister purge valve 92 may be a solenoid valve wherein opening or closing of the valve is performed via actuation of a canister purge solenoid.

Canister 90 includes a vent 86 for routing gases out of the canister 90 to the atmosphere when storing, or trapping, fuel vapors from fuel tank 20. Vent 86 may also allow fresh air to be drawn into fuel vapor canister 90 when purging stored fuel vapors to engine intake passage 13 via purge line 91 and purge valve 92. While this example shows vent 86 communicating with fresh, unheated air, various modifications may also be used. Vent 86 may include a canister vent valve 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when purge valve 92 and canister vent valve 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In some embodiments, a pressure sensor may additionally be coupled between the canister 90 and the canister vent valve 87, such as pressure sensor 98 coupled to an evaporative level check module (ELCM) 99, for example. One or more temperature sensors 24 may also be coupled to fuel system 18 for providing an estimate of a fuel system temperature. A canister temperature sensor 97 may be coupled to canister 90 and configured to indicate temperature changes of the adsorbent material within the canister. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 91 may be regulated by canister purge valve 92, coupled between the fuel vapor canister and the engine intake.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; CKCP sensor 77, BP sensor 57, CIP sensor 61, TIP sensor 59, canister temperature sensor 97, etc. Furthermore, controller 12 may monitor and adjust the position of various actuators 118 based on input received from the various sensors. These actuators may include, for example, throttle 42, intake and exhaust valve systems 40, 41, PCV valve 78, PCV isolation valve 131, CPV 92, FTIV 85, etc. Storage medium read-only memory 112 can be programmed with computer readable data representing instructions executable by processor 108 for performing the methods described below, as well as other variants that are anticipated but not specifically listed.

Turning now to FIGS. 2A-2B, depicted are two different illustrative views 200 and 220, respectively, of a push side, or first, oil separator of the present disclosure. Specifically, FIG. 2A depicts first oil separator 202 (e.g., same as first oil separator 80 at FIG. 1) from a first view 200 (refer to inset 201 for reference axes). For reference, first oil separator 202 includes a first side 213, and a second, opposite side, 214. Lid 203 is open, to illustrate fourteen smaller sealing flaps 204, and a single larger sealing flap 205. When viewed from the illustrative view 200 at FIG. 2A, it may be understood that an external face 207 of lid 203 is viewable, and an internal face is not viewable at FIG. 2A. The larger sealing flap 205 is secured to lid 203 via a larger sealing flap fastener 206. The larger sealing flap fastener 206 holds in place a first portion 207 of larger sealing flap 205, thereby allowing a second portion 208 of larger sealing flap 205 to passively open and close in response to pressure differences across the second portion 208 of larger sealing flap 205. It may be understood that smaller sealing flaps 204 may operate in similar fashion, and further description of smaller sealing flaps 204 will be discussed in greater detail below with regard to FIG. 2B.

First oil separator 202 is depicted as having a housing 209. One or more bolts 210 (and associated nuts) may be used to secure housing 209 to the crankcase (e.g., crankcase 28 at FIG. 1). A coupling passageway, or port, 211 may provide oil drainage. Port 212 is equivalent to port 81 of FIG. 1, which provides a path for oil vapors from the crankcase to enter the separator. The vent hose (e.g., vent hose 74 at FIG. 1) may be connected to the oil separator, but is not depicted in FIGS. 2A-D.

Turning now to FIG. 2B depicted is second view 220 of the second or opposite side 214 of first oil separator 202 as compared to that depicted at FIG. 2A (refer also to reference axes 222). Lid 203 is again depicted as open, revealing inner compartment 221 where air is stripped of oil such that oil can be returned back to the crankcase. As illustrated at FIG. 2B, the fourteen smaller sealing flaps 204 are comprised of a single piece that includes a first portion 223 from which extends fourteen different second portions 204a, similar to that discussed above with regard to the larger sealing flap 205 at FIG. 2A.

The first portion 223 of smaller sealing flaps 204 is secured to lid 203 by a number of smaller sealing flap fasteners 225. In this way, the second portions 204a of smaller sealing flaps 204 may open/close in response to pressure differences across the second portion 204a of the smaller sealing flaps 204.

It may be understood that the larger sealing flap 205 and the smaller sealing flaps 204 may open in different directions, and responsive to different pressure differentials. For example, the fourteen smaller sealing flaps 204 may open in response to crankcase pressure minus air intake system pressure being greater than a predetermined minimum pressure difference. On the other hand, the one larger sealing flap 205 may open in response to crankcase pressure minus air intake system pressure being less than another predetermined minimum pressure difference. It may further be understood that neither the fourteen smaller sealing flaps 204 nor the larger sealing flap 205 may be open when a pressure differential between the crankcase and the air intake system is within a predetermined threshold of a zero pressure difference. In other words, when a pressure differential between the crankcase and the air intake system is within the predetermined threshold of the zero pressure difference, then it may be understood that the vent hose (e.g., vent hose 74 at FIG. 1) may be sealed from the crankcase (e.g., crankcase 28 at FIG. 1).

Turning now to FIG. 2C, depicted is an example illustration 250, depicting in general how a sealing flap (e.g., larger sealing flap 205, or smaller sealing flaps 204 at FIGS. 2A-2B) may passively respond to pressure differences in order to open and close. It may be understood that the example illustration 250 at FIG. 2C is exemplary, and is not meant to refer specifically to any particular aspect of FIGS. 2A-2B, but rather is shown to illustrate how each of the larger and smaller sealing flaps of FIGS. 2A-2B may operate.

Accordingly, FIG. 2C depicts sealing flap 252, that is secured to housing 253 via sealing flap fastener 254. Responsive to an increasing pressure in the direction of arrow 255, at least a portion of sealing flap 252 may be displaced from a seated position (not shown at FIG. 2C), to occupy an open position (as depicted at FIG. 2C), to enable air flow through the displaced sealing flap 252, in the direction of smaller arrows 256. In the absence of a pressure difference across sealing flap 252, or even when pressure in the direction of arrow 255 is substantially less than pressure in the direction of arrow 257, then sealing flap 252 may no longer be displaced and instead may occupy the seated position, thus sealing off a first side 258 from a second side 259 of sealing flap 252.

FIG. 2D depicts a graphical illustration 260 of how the smaller and larger sealing flaps of FIGS. 2A-2B may generally operate. It may be understood that the graphical illustration at FIG. 2D is meant to be exemplary. Depicted on the x-axis is a fluid flow rate (e.g, in liters/min), and on the y-axis is depicted a pressure drop (e.g., in mbar). As illustrated by plot 265, flow rate increases as a pressure differential across a sealing flap increases. Importantly, when there is an absence of a pressure difference across the sealing flap, exemplified by arrow 266, flow across the sealing flap is prevented (e.g., no flow).

As discussed above with regards to FIGS. 1-2D, by positioning the CKCP sensor (e.g., CKCP sensor 77 at FIG. 1) such that the vent hose (e.g., vent hose 74 at FIG. 1) is between the CKCP sensor and the air intake system, under certain conditions when the pressure difference between the crankcase and air intake system is such that the push-side oil separator (e.g., first oil separator 80 at FIG. 1) seals the crankcase from the PCV system vent hose, the CKCP sensor may be exposed to just air intake system pressure differentials and may not be exposed to crankcase pressures. This may enable a diagnostic routine to infer whether the vent hose is properly connected, or is disconnected or degraded to some extent. Specifically, by conducting the diagnostic under conditions where the CKCP sensor is not exposed to crankcase pressures, the diagnostic for detecting vent hose degradation may be improved over prior art approaches where it can be challenging to correctly diagnose vent hose degradation due to the CKCP sensor sensing both air intake system pressure fluctuations and crankcase pressure fluctuations.

Turning now to FIG. 3, depicted is a prophetic example timeline 300, illustrating a manner in which a diagnostic may be conducted to infer whether the PCV vent hose (e.g., vent hose 74 at FIG. 1) is degraded or not. Timeline 300 includes plot 305, indicating pressure as monitored via the CKCP sensor (e.g., CKCP sensor 77 at FIG. 1), over time. It may be understood that with regard to this example timeline, the CKCP sensor is included in the push-side cam cover of the engine, such that the vent hose is between the air intake system and the CKCP sensor. Timeline 300 further includes plot 310, indicating a CKCP line length, over time. Briefly, the CKCP line length comprises a calculation metric used to determine whether the vent hose is connected or disconnected (or exhibiting some other form of degradation). As will be elaborated in greater detail below, the CKCP line length may be computed from the Pythagorean theorem as a function of time samples during a monitoring window for the diagnostic and pressures as monitored via the CKCP sensor during the same monitoring window. If the CKCP line length is within a predetermined threshold length of the monitoring window time duration, then it may be inferred that the vent hose is disconnected, or in other words, degraded. Timeline 300 further includes plot 315, indicating engine speed (e.g., RPM), over time. The engine may be stopped (e.g., 0 RPM), or may be rotating at a speed greater than (+) zero RPM, over time. Timeline 300 further includes plot 320, indicating whether intake air filter restriction is indicated (yes or no), over time. Intake air filter restriction may be indicated based on amplitude of pressure pulsations as monitored via the CKCP sensor, as will be elaborated in greater detail below. Timeline 300 further includes plot 325, indicating whether PCV vent hose degradation is indicated (yes or no), over time. Timeline 300 further includes plot 330, indicating whether the PCV vent hose (e.g., vent hose 74 at FIG. 1) is sealed, or in other words, isolated, from the crankcase (e.g., crankcase 28 at FIG. 1) (yes or no), over time. It may be understood that in this example timeline, when the PCV vent hose is sealed from the crankcase, it may be understood that pressure across the one or more oil separator sealing flaps is such that the one or more sealing flaps are closed, thus sealing the crankcase from the vent hose as discussed with regards to FIGS. 1-2D above.

At time t0, the engine is not rotating (plot 315). It may be understood, although not explicitly shown, that at time t0 the engine is not rotating because the vehicle is at a standstill. With the engine not rotating, the CKCP sensor is not registering pressure fluctuations (plot 305). A diagnostic as to whether there is a presence or absence of degradation associated with the PCV vent hose (e.g., vent hose 74 at FIG. 1) has not yet been initiated, and thus the CKCP line length calculation (discussed in greater detail below) has not yet begun to be determined (plot 310). Furthermore, because the diagnostic has not yet been initiated, presently there is no indication of intake air filter restriction (plot 320), and as of time t0 PCV vent hose degradation is not indicated (plot 325).

At time t1, the engine speed begins to increase (plot 315). In this example timeline 300, it may be understood that engine speed begins to increase via a starter motor being commanded via the controller to rotate the engine, responsive to a driver of the vehicle requesting increased engine torque to propel the vehicle. Such a request may be understood to be initiated via the driver pressing down on the accelerator pedal. In response to the starter motor being engaged to rotate the engine, a monitoring window begins at time t1. While not explicitly illustrated, it may be understood that in this example timeline 300, the monitoring window comprises a time duration between time t1 and t2.

Between time t1 and t2, the CKCP sensor records pressure fluctuations that are the result of a change in air flow through the air intake system (e.g., air intake system 27 at FIG. 1) as the engine begins rotating from a stopped position. Because the vent hose is isolated or sealed from the crankcase (plot 330), it may be understood that the CKCP sensor is not reporting on crankcase pressures but rather is just reporting on the pressure fluctuations associated with the change in air flow through the air intake system. It may be understood that the vent hose is isolated from the crankcase because a pressure differential across the one or more flaps associated with the push-side oil separator is such that the one or more flaps are closed, thereby sealing the vent hose from the crankcase. Specifically, as mentioned above, the pressure differential may be within a threshold of a zero pressure differential between the crankcase and the vent hose.

The pressure fluctuations between time t1 and t2 do not exceed a positive pressure fluctuation threshold (refer to line 306), and additionally do not exceed a negative pressure fluctuation threshold (refer to line 307). Accordingly, because the monitored pressure fluctuations are within an area bounded by the positive and negative pressure fluctuation thresholds, intake air filter restriction is not indicated (plot 320). Specifically, it is herein recognized that air intake system pressure pulsation amplitude (in the positive and negative directions) increases with increasing intake air filter restriction. Thus, by monitoring an amplitude of the pressure pulsations, a determination can be made as to whether the intake air filter is potentially degraded. Furthermore, an extent to which the intake air filter is degraded may in some examples be possible to ascertain. For example, the extent to which the intake air filter is degraded may be a function of a magnitude by which the pressure pulsations exceed the positive and/or negative pressure fluctuation thresholds. More specifically, the controller may access a lookup table that references extent to which the pressure pulsations exceed the positive/negative pressure fluctuation thresholds as a function of extent of intake air filter clogging. In this way, the controller may be able to determine not just that the intake air filter may be clogged, but also may determine an extent (e.g., 20%, 50%, 75%, etc.) to which the intake air filter is clogged.

Between time t1 and t2, engine speed increases (plot 315) and the CKCP sensor monitors pressure pulsations (plot 305) as discussed. As shown by plot 310, the CKCP line length increases linearly over time during the timeframe spanning time t1 and t2. Accordingly, how the CKCP line length is determined is now discussed.

The CKCP line length calculation may be understood to be a metric used to infer whether there is degradation associated with the PCV vent hose. The CKCP line length calculation may be computed from the Pythagorean Theorem via the following formula:

$$CKCP_{LL} = \text{sum}[\text{sqrt}((x_1-x_0)^2+(y_1-y_0)^2)];$$

where $x_{0,1}$ are time samples during the monitoring window and where $y_{0,1}$ are CKCP pressure samples during the monitoring window. Degradation associated with the PCV vent hose may be determined by normalizing the line length ($CKCP_{LL}$) by the monitoring window time and comparing this normalized line length to a predetermined threshold. In response to the normalized line length being less than the predetermined threshold, a presence of degradation associated with the vent hose may be determined. The monitoring window may start, for example, when the starter motor is engaged, and may end when a differential pressure across the oil separator reaches a point where fluid flow between the crankcase and the vent hose is enabled due to the one or more sealing flaps associated with the oil separator opening to at least some extent. Additionally or alternatively, the monitoring window may end when engine speed reaches some predetermined engine speed. For example, the predetermined engine speed may be selected to avoid sample aliasing at higher engine firing frequencies. With regards to the CKCP line length determination, it is further herein recognized that any manners of determining the CKCP line length or a similarly related parameter may additionally or alternatively be utilized without departing from the scope of this disclosure, including but not limited to variance, maximum amplitude, or area inside curve integration approaches.

In this example timeline 300, it may be understood that at time t2, the monitoring time window ends. Specifically, the monitoring time window ends as the pressure differential across the push-side oil separator reaches a point where the vent hose is no longer completely isolated from the crankcase (plot 330). While not explicitly illustrated, at time t2 the controller normalizes the CKCP line length determination to the monitoring window duration (spanning time t1-t2), and compares the normalized CKCP line length to the predetermined threshold mentioned above. In this example timeline 300, the controller infers that the normalized CKCP line length is greater than the predetermined threshold, and as such determines that there is an absence of degradation associated with the PCV vent hose (plot 325). After time t2, engine speed continues to increase as a function of driver demand (plot 315).

Turning now to FIG. 4, depicted is another prophetic example timeline 400, illustrating how the vent hose diagnostic discussed at FIG. 4 may be used to infer whether the PCV vent hose is degraded, or not. While the example timeline at FIG. 3 illustrated a situation where vent hose degradation was not indicated, the example timeline of FIG. 4 depicts a situation where vent hose degradation is indicated. Timeline 400 includes plot 405, indicating pressure as monitored via the CKCP sensor (e.g., CKCP sensor 77 at FIG. 1), over time. Similar to that discussed above with regard to FIG. 3, the CKCP sensor is included in the push-side cam cover of the engine, such that the vent hose is between the air intake system and the CKCP sensor. Timeline 400 further includes plot 410, indicating CKCP line length, over time. Line length may be determined in similar fashion as that discussed above with regard to FIG. 3. Timeline 400 further includes plot 415, indicating engine speed (e.g., engine RPM), over time. The engine may be stopped (e.g., zero RPM), or may be rotating at a speed greater than (+) stopped, over time. Timeline 400 further includes plot 420, indicating whether vent hose degradation is indicated (yes or no), over time. Timeline 400 further includes plot 425, indicating whether the PCV vent hose is isolated from the crankcase (yes or no), over time.

At time t0, the engine is not rotating (plot 415) due to the vehicle being at a standstill (not specifically shown), and accordingly, the CKCP sensor is not registering pressure fluctuations (plot 405). The vent hose is isolated from the crankcase (plot 425), due to the pressure differential across the push-side oil separator (e.g., first oil separator 80 at FIG. 1) being within the predetermined threshold of zero pressure differential. Because the engine has not yet begun rotation, the vent hose diagnostic has not yet begun, and accordingly the CKCP line length determination has not yet been initiated (plot 410), and PCV vent hose degradation is not yet indicated (plot 420).

At time t1, the starter motor is engaged via the controller in response to a request for increased engine torque via the vehicle operator to begin propelling the vehicle forward. The engaging of the starter motor causes the engine to begin rotating (plot 415) at time t1, and accordingly the monitoring time window begins at time t1.

Between time t1 and t2, the vent hose remains isolated from the crankcase, and pressure pulsations are monitored via the CKCP sensor. However, in contrast to the pressure pulsations associated with the engine beginning rotation from rest shown above at FIG. 3, in this example timeline 400 there is essentially an absence of pressure pulsations as reported via the CKCP sensor. It may be understood that the y-axis magnitude for each of the plots associated with the CKCP sensor and CKCP line length are the same between FIG. 3 and FIG. 4, to enable comparison there between.

Between time t1 and t2, CKCP line length (plot 410) increases a very small amount (compared to that discussed above with regard to FIG. 3), and at time t2, the monitoring time window ends. It may be understood that in this example timeline 400 the monitoring time window ends as the vent hose is no longer isolated from the crankcase (e.g., differential pressures across the push-side oil separator are such that the one or more sealing flaps associated with the push-side oil separator are no longer completely closed, thus resulting in fluid flow between the crankcase and the PCV vent hose.

At time t2, while not explicitly illustrated, the controller normalizes the CKCP line length to the monitoring window time duration, and compares the normalized CKCP line length to the predetermined threshold as discussed above with regards to FIG. 3. In this example timeline 400, it may be understood that the controller determines that the normalized CKCP line length is less than the predetermined threshold, and accordingly, PCV vent hose degradation is indicated (plot 420). Thus, it may be understood that degradation associated with the vent hose may be indicated when the CKCP line length is substantially similar (e.g., within 5% or less) to the monitoring window length.

After time t2, engine speed continues to increase as a function of driver demand similar to that discussed above with regard to FIG. 3.

Figure 5:
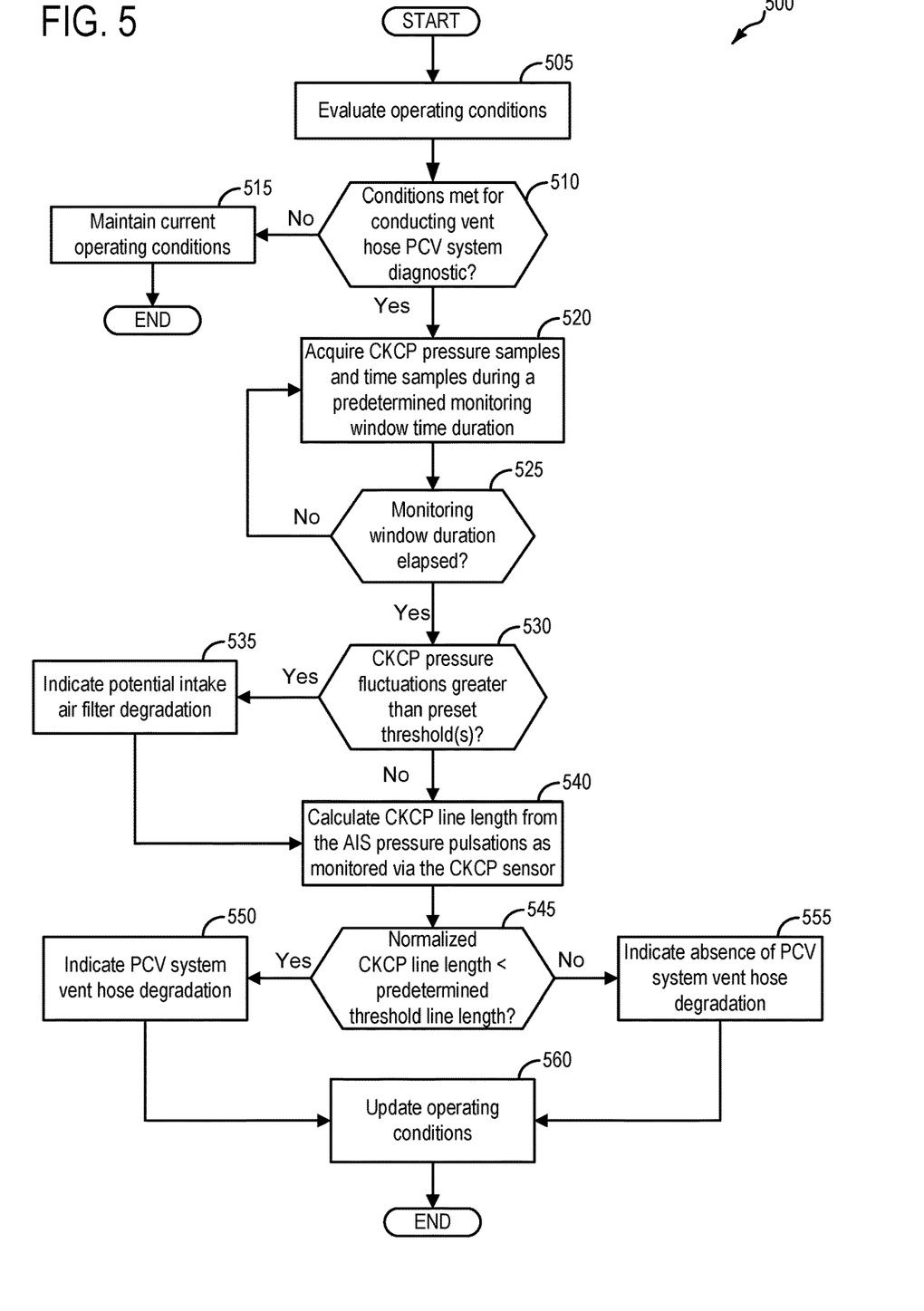
FIG. 5 shows a high-level example method for conducting the PCV vent hose diagnostic as depicted in the prophetic example timelines of FIGS. 3-4.

Turning now to FIG. 5, depicted is a high-level example method 500 for inferring whether there is a presence or an absence of degradation associated with the PCV vent hose (e.g., vent hose 74 at FIG. 1). Specifically, method 500 may be utilized for engine systems in which the vent hose is positioned between the CKCP sensor (e.g., CKCP sensor 77 at FIG. 1) and the air intake system (e.g., air intake system 27 at FIG. 1). Method 500 may further be utilized for engine systems in which the CKCP sensor is positioned on a fresh air side of a push side oil separator (e.g., first oil separator 80 at FIG. 1), at a position not within the vent hose (e.g., in a push side cam cover). Still further, method 500 may be utilized for engine systems in which the oil separator comprises one or more sealing flaps or other actuators that passively seal when a pressure differential across the oil separator (e.g., pressure differential between the crankcase and the vent hose) is within a predetermined threshold (e.g., within 3%, 2%, 1%, etc.) of a zero pressure differential.

Method 500 will be described with reference to the systems described herein and shown in FIGS. 1-2D, though it should be understood that similar methods may be applied to other systems without departing from the scope of this disclosure. Method 500 may be carried out by a controller, such as controller 12 at FIG. 1, and may be stored in the controller as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIG. 1. The controller may employ vehicle system actuators such as fuel injector(s) (e.g., fuel injector 45 at FIG. 1), starter motor (e.g., motor/generator 152 at FIG. 1), etc., to alter states of devices in the physical world according to the method below.

Method 500 begins at 505, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 510, method 500 includes indicating whether conditions are met for conducting the vent hose diagnostic discussed above at FIGS. 3-4. Conditions being met may include an indication that a predetermined time duration has elapsed since a prior vent hose diagnostic was conducted. Additionally or alternatively, conditions being met may include an indication that the vent hose is completely sealed from the crankcase. As discussed above, a push-side oil separator (e.g., first oil separator 80 at FIG. 1) may include one or more sealing flaps (e.g., refer to FIGS. 2A-2B) which may completely or fully close responsive to a pressure differential across the one or more sealing flaps being within a threshold of a zero pressure differential. Thus, under conditions where the one or more sealing flaps are fully closed, it may be understood that the vent hose may be completely or fully sealed from the crankcase. Additionally or alternatively, conditions being met at 510 may include an indication that an engine crank is being initiated, for example via the starter motor, that an engine pull-up is initiated (e.g., in the case of a start/stop hybrid), that the engine is idling under conditions where the vent hose is fully sealed from the crankcase, etc.

If, at 510, conditions are not indicated to be met for conducting the PCV vent hose diagnostic, method 500 proceeds to 515. At 515, method 500 includes maintaining current operating conditions. As an example, maintaining current operating conditions may include maintaining engine operation as a function of driver demand to continue propelling the vehicle. Method 500 may then end.

Returning to 510, responsive to conditions being indicated to be met for conducting the PCV vent hose diagnostic, method 500 proceeds to 520. At 520, method 500 includes acquiring CKCP sensor data at predetermined time sampling points during the monitoring window discussed above with regard to FIGS. 3-4. Proceeding to 525, method 500 includes indicating whether the monitoring window duration has elapsed. As discussed above, in some examples the monitoring window may be defined as between a time when the engine is initially controlled (e.g., via the starter motor) to begin rotating, and another time when the vent hose becomes at least somewhat fluidically coupled to the crankcase. Additionally or alternatively, in some examples the monitoring window may be defined as between a time when the engine is initially controlled (e.g., vai the starter motor) to being rotating, and another time when an engine speed reaches a predetermined engine speed. In still other examples the monitoring window may be initiated during an engine idle condition at a first predetermined time under conditions where the vent hose is sealed from the crankcase, and may be end at a second predetermined time that is, for example, a predetermined duration from the first predetermined time.

If at 525, the monitoring window duration has not yet elapsed, method 500 may return to 520, where CKCP pressure data may continue to be acquired at predetermined time sampling points. Responsive to the monitoring window duration elapsing, method 500 proceeds to 530. At 530, method 500 includes indicating whether CKCP pressure fluctuations have exceeded positive and/or negative pressure fluctuation thresholds (e.g., pressure fluctuation thresholds 306 and 307 at FIG. 3). If so, method 500 proceeds to 535, where potential air filter degradation is indicated. For example, the controller may set a flag, and in some examples may illuminate an indicator light at the vehicle dash to alert the vehicle operator of a request to change the intake air filter. In some examples, as mentioned above, a magnitude by which the pressure fluctuations exceed the positive and/or negative pressure fluctuation thresholds may be used to infer an extent to which the intake air filter is clogged. The controller may, upon retrieving the data from the CKCP sensor, determine the magnitude by which the pressure fluctuations exceed the positive and/or negative pressure fluctuation thresholds. The controller may then query a lookup table that stores values for clogging extent as a function of magnitude by which the pressure fluctuations exceed the positive and/or negative pressure fluctuation thresholds, in order to infer the extent to which the intake air filter is clogged. In some examples, a malfunction indicator light may be illuminated when it is inferred that the clogging is greater than some predetermined percentage (e.g., 50%, 60%, 75%, etc.).

Whether air filter clogging is indicated or not, method 500 proceeds to 540. At 540, method 500 includes calculating CKCP line length based on the data acquired from the CKCP sensor and time sampling parameters. As an in-depth description of how the CKCP line length determination is conducted was provided above, for brevity the description will not be reiterated here.

With the CKCP line length determined at 540, method 500 proceeds to 545. At 545, method 500 includes determining whether a normalized CKCP line length is less than a predetermined threshold (e.g., predetermined threshold line length). If so, method 500 proceeds to 550, where the controller indicates degradation associated with the PCV vent hose. For example, a flag may be set regarding the indication of degradation. Proceeding to 560, method 500 includes updating operating conditions. Updating operating conditions may in some examples include illuminating a malfunction indicator light (MIL) at the vehicle dash to alert the vehicle operator of a request to service the vehicle. Updating operating conditions at 560 may additionally or alternatively include taking mitigating action in order to reduce an impact that the degradation associated with the PCV vent hose may have on the overall engine system operation and/or lifetime. As one example, mitigating action may include the controller commanding an electric-only mode of operation as much as possible, so that the engine may remain off during drive cycles as much as possible until the issue of the degradation is remedied. As another example the controller may limit a use of boosted engine operation as much as possible. Method 500 may then end.

Returning to 545, in response to an indication that the normalized CKCP line length is not less than the predetermined threshold line length, method 500 proceeds to 555 where an absence of degradation associated with the PCV vent hose is indicated. Proceeding to 560, method 500 includes updating operating conditions. For example, the controller may store information related to the fact that the PCV hose diagnostic was conducted, and that the hose diagnostic revealed the absence of degradation associated with the PCV vent hose. Method 500 may then end.

While the above description pertained to the use of a push-side oil separator capable of sealing the vent hose from the crankcase, it is herein recognized that there may be other options that may achieve similar objectives without departing from the scope of this disclosure. As one example, an electrically-actuatable valve (e.g., solenoid valve) may be included in the PCV system of FIG. 1 such that when commanded closed, the valve may seal the vent hose from the crankcase in similar fashion as that passively achieved by the oil separator of the present disclosure. An advantage over the use of an electrically-actuatable valve is that the oil separator of the present disclosure may passively enable the crankcase to be sealed from the vent hose, thereby reducing complexity in terms of control strategy for conducting the PCV hose diagnostic discussed herein.

In this way, a PCV vent hose that fluidically couples a crankcase to an air intake system may be diagnosed as to whether there is a source of degradation associated with the vent hose, or if the vent hose is functioning as expected or desired. By robustly and readily diagnosing a presence or absence of degradation associated with the vent hose, engine lifetime may be increased, release of undesired emissions to atmosphere may be reduced, and customer satisfaction may overall be improved.

The technical effect of including an oil separator that essentially acts as a passive isolation valve is that at predetermined engine operating conditions (e.g., engine crank, idle, stop-start HEV engine pull-ups, etc.) it may be expected that the oil separator may seal the vent hose from the crankcase, which may thereby enable a CKCP sensor to report on air intake system pressure fluctuations without confounding pressures stemming from the crankcase influencing the CKCP sensor readout. A technical effect of positioning the CKCP sensor in a cam cover is that such positioning places the vent hose between the air intake system and the CKCP sensor. A further technical effect is that positioning the CKCP sensor in the cam cover on a fresh air side of the oil separator may protect the CKCP sensor from liquid oil and/or combustion byproducts.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
sealing a crankcase of an engine from a vent hose that is part of a positive crankcase ventilation system;
initiating cranking of the engine and monitoring a series of pressure pulsations during a monitoring window duration via a pressure sensor positioned between a crankcase oil separator and the vent hose; and
indicating a presence or an absence of degradation based on the series of pressure pulsations and the monitoring window duration, wherein the monitoring window ends when the crankcase of the engine is no longer fully sealed from the vent hose or when the engine reaches a predetermined engine speed.

2. The method of claim 1, wherein the vent hose fluidically couples the crankcase to an air intake system of the engine.

3. The method of claim 1, wherein the pressure sensor is included on a side of the crankcase near the vent hose and the crankcase oil separator.

4. A method comprising:
sealing a crankcase of an engine from a vent hose that is part of a positive crankcase ventilation system;
initiating cranking of the engine and monitoring a series of pressure pulsations during a monitoring window duration via a pressure sensor positioned between a crankcase oil separator and the vent hose; and
indicating a presence or an absence of degradation based on the series of pressure pulsations and the monitoring window duration, wherein the crankcase oil separator includes one or more sealing flaps that close responsive to a pressure differential between the crankcase and the vent hose being within a predetermined threshold of a zero pressure differential; and
wherein sealing the crankcase of the engine from the vent hose comprises the one or more sealing flaps closing based on the pressure differential between the crankcase and the vent hose being within the predetermined threshold of the zero pressure differential.

5. The method of claim 1, wherein the monitoring window begins when the engine cranking is initiated.

6. The method of claim 4, wherein the monitoring window ends when the crankcase of the engine is no longer fully sealed from the vent hose.

7. The method of claim 1, wherein sealing the crankcase of the engine from the vent hose includes commanding closed a valve positioned to selectively fluidically couple the crankcase to the vent hose.

8. The method of claim 1, further comprising indicating a restriction in an intake air filter of the engine responsive to the series of pressure pulsations exceeding a pressure pulsation threshold during the monitoring window duration.

9. The method of claim 8, further comprising indicating an extent of the restriction in the air intake filter as a function of another extent by which the series of pressure pulsations exceed the pressure pulsation threshold during the monitoring window duration.

10. A system for vehicle, comprising:
a crankcase of an engine including oil;
an oil separator with one or more sealing flaps that selectively fluidically couple the crankcase to an air intake system of the engine by way of a vent hose that is part of a positive crankcase ventilation system;
a crankcase pressure sensor positioned between the vent hose and the oil separator; and
a controller with computer readable instructions stored on non-transitory memory that, when executed under conditions where the one or more sealing flaps are fully closed thereby sealing the crankcase from the vent hose, cause the controller to:
via the crankcase pressure sensor, monitor an air intake system pressure profile during a monitoring window;
infer a presence of degradation associated with the vent hose based on a relationship between a magnitude of the air intake system pressure profile and a duration of the monitoring window; and
command mitigating action responsive to the presence of degradation.

11. The system of claim 10, further comprising a cam cover; and
wherein the crankcase pressure sensor is positioned at a location between the vent hose and the oil separator.

12. The system of claim 10, wherein the controller stores further instructions to indicate that the presence of degradation includes the vent hose being disconnected from either or both of the air intake system and the crankcase; and
wherein taking mitigating action includes setting a malfunction indicator light to alert an operator of the vehicle of a request to service the vehicle.

13. The system of claim 12, further comprising an onboard energy storage device that supplies power to a motor capable of propelling the vehicle; and
wherein the controller stores further instructions to take mitigating action to operate the motor to propel the vehicle as frequently as possible in lieu of operation of the engine in response to the presence of degradation associated with the vent hose.

14. The system of claim 10 wherein the positive crankcase ventilation system is a dual-flow system capable of bi-directional fluid flow through the crankcase.

15. The system of claim 10, further comprising an air intake filter positioned in the air intake system upstream of a point where the vent hose is connected to the air intake system; and
wherein the controller stores further instructions to indicate that the air filter is clogged in response to the air intake system pressure profile exceeding a pressure threshold during the monitoring window.

16. The system of claim 10, wherein the controller stores further instructions to initiate the monitoring window when the engine begins to rotate from a stopped position; and
conclude the monitoring window when the one or more sealing flaps are no longer fully closed.

17. A method for determining a state of a crankcase vent hose, comprising:
assessing a state of the crankcase vent hose in response to a flap of an oil separator being in a closed position;

not assessing the state of the crankcase vent hose in response to the flap of the oil separator being in an open position; and providing an indication of degradation in response to the assessed state of the crankcase vent hose.

18. The method of claim 17, wherein the oil separator is included in a crankcase from which stems the crankcase vent hose; and wherein the crankcase vent hose is sealed from the crankcase when the flap of the oil separator is in the closed position.

19. The method of claim 17, wherein assessing the state of the crankcase vent hose is based on a pressure profile obtained during a predetermined monitoring window, the pressure profile obtained via a crankcase pressure sensor positioned between the oil separator and the vent hose.

* * * * *